Figure 1:
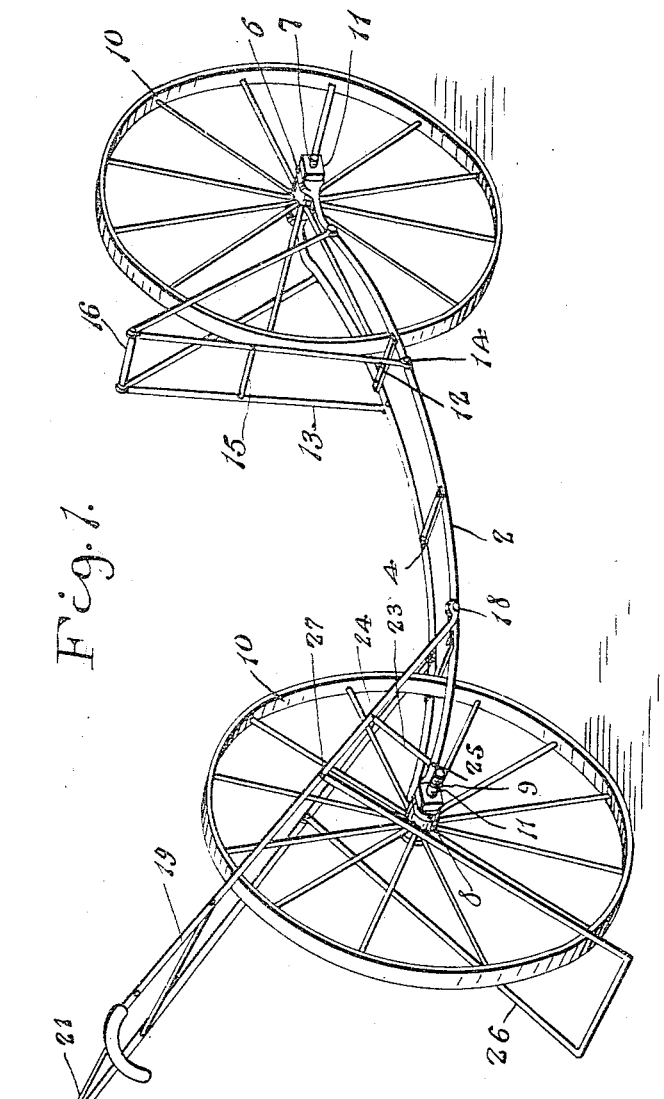

W. H. MAYFIELD.
TRUCK.
APPLICATION FILED OCT. 14, 1916.

1,245,004.

Patented Oct. 30, 1917.
2 SHEETS—SHEET 1.

Witness:-
J. R. Wahler.
H. Kaye Martin.

Inventor
W. H. Mayfield.
By A. Randolph Jr.,
Attorney

W. H. MAYFIELD.
TRUCK.
APPLICATION FILED OCT. 14, 1916.
1,245,004.
Patented Oct. 30, 1917.
2 SHEETS—SHEET 2.
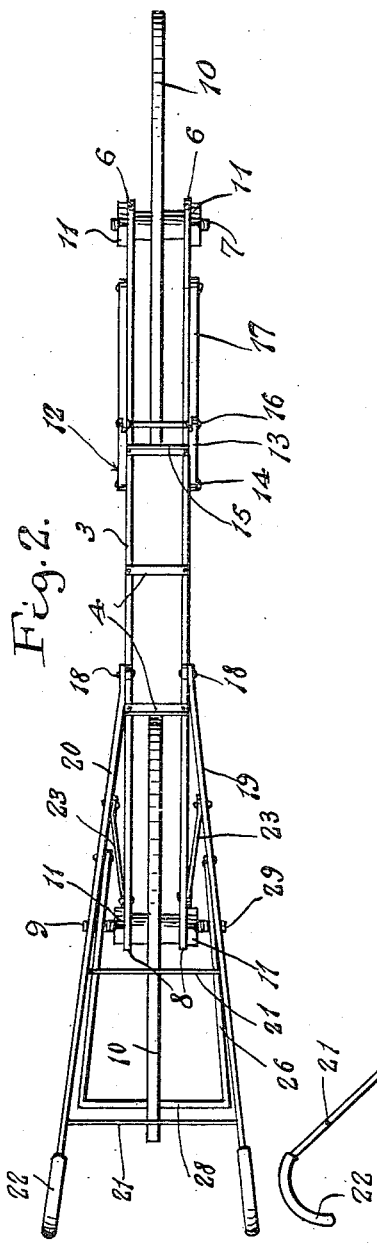
Witness
J. P. Wakley,
H. Kay Martin
Inventor
W. H. Mayfield.
By Randolph Jr.,
Attorney

UNITED STATES PATENT OFFICE.

WILLIAM H. MAYFIELD, OF WAMIC, OREGON.

TRUCK.

1,245,004.  Specification of Letters Patent.  Patented Oct. 30, 1917.

Application filed October 14, 1916. Serial No. 125,581.

*To all whom it may concern:*

Be it known that I, WILLIAM H. MAYFIELD, a citizen of the United States, residing at Wamic, in the county of Wasco and State of Oregon, have invented certain new and useful Improvements in Trucks; and I do hereby declare the following to be a full, clear, and exact description of the invention, such as will enable others skilled in the art to which it appertains to make and use the same.

This invention relates to new and useful improvements in trucks and the principal object of the invention is to provide a device which is adapted for use in the carrying of packages and the like without requiring a great amount of exertion on the part of the user.

Another object of the invention is to provide a device consisting of a two wheel vehicle provided with a baggage or package carrying space and also having a supporting bar for the operator of the device.

A still further object of the invention is to provide a device which may be used on a sidewalk, street, or over a comparatively rough road.

With these and other objects in view the invention consists in the novel combination and arrangement of parts which will be fully set forth in the following specification and accompanying drawings, in which:—

Figure 1 is a perspective view of a truck constructed in accordance with this invention, Fig. 2 is a top plan view of the same, and Fig. 3 is a side view in elevation of Fig. 2.

Referring to the drawings, the numeral 1 designates as an entirety the chassis of the device consisting of a pair of curved side bars 2 and 3 which are held in spaced parallel relation by means of suitable cross braces 4. The forward ends of the bars are curved downwardly as at 5 and provided with enlargements 6 which are apertured to receive the axles 7 on which the forward wheel is mounted. The rear end of each bar is provided with an enlargement 8 formed with a suitable opening for the reception of the axle or bolt 9 on which the rear wheel is rotatably mounted. As shown in the drawings, the wheels designated by the numeral 10 are mounted on the axles 7 and 9 and the hubs of said wheels are relatively wide so as to keep the rim of each of the wheels from engaging the side bars thus insuring the free running of the wheels on the axles. The axles above referred to comprise suitable bolts or threaded rods on which the nuts 11 are threaded and it will thus be seen that upon loosening one of the nuts for each wheel, the bolt may be withdrawn and the wheel removed in order that repairs may be made thereto.

A suitable rack designated generally by the numeral 12 is attached to the chassis 1 slightly in the rear of the front wheel and this rack comprises a pair of side bars 13 which are attached as at 14 to the side bars 2 and 3 adjacent their forward ends and these bars 13 are connected intermediate their ends by a transverse rod 15 and at their upper ends by means of suitable rivets 16 they are connected to the brace rods 17 which extend downwardly and forwardly to a point slightly in the rear of the curved portions 5 of the bars 2 and 3 where the brace rods 17 are attached. It will thus be seen that the rack or frame 12 is supported in an upwardly and forwardly inclined position with relation to the side bars of the chassis. Formed integrally with the side bars 2 and 3 intermediate their ends are a pair of upstanding ears 18 to which the forward ends of the handle bars 19 and 20 are attached. These handle bars extend upwardly in divergent planes and are connected and held in proper position by suitable cross bars 21. The upper rear ends of the handle bars are curved as shown in Figs. 2 and 3 and provided with suitable grips 22 to provide hand holds. Suitable brace bars 23 are attached at 24 to the handle bars 19 and 20 at a point near their lower forward ends and these brace bars extend downwardly and rearwardly and are connected as at 25 adjacent the rear end of the side bars 2 and 3 of the chassis 1. It will thus be seen that the handle bars will be rigidly supported with relation to the chassis and thus the device may be readily controlled.

In order to provide a riding attachment by means of which the operator may coast at suitable times when the device gained sufficient momentum, a suitable pair of divergent arms or legs 26 are pivotally attached as at 27 to the handle bars 19 at a point slightly to the rear and above the point where the brace rods 23 are attached thereto and these legs extend outwardly from said handle bars in divergent planes and are provided at their outer ends with a suitable cross rod or foot rest 28 on which the operator may stand when coasting. It will be seen however that should it be desired the legs may be swung on their pivots 27 and thrown upwardly against the under side of the handle bars and the device may be propelled by walking in the rear thereof and pushing on said handle bars. When in the lowered position however it will be seen that the legs 26 will be supported in the position shown in Fig. 3 by engagement with the extended portions 29 of the rear axle 9 and thus the bar 28 will be prevented from contacting with the ground.

It will be apparent from the foregoing that in use the device is loaded with the desired articles which are placed on the chassis 1 between the front and rear wheels and the operator may then grasp the grips 22 and by walking in the rear of the device propel the same along. Should it be desired to coast, it will be seen that the legs 26 are dropped in the position shown in the drawings and the operator may stand on the cross bar 28.

While in the foregoing there has been shown and described the preferred embodiment of this invention, it is to be understood that such changes may be made in the combination and arrangement of parts as will fall within the spirit and scope of the invention as claimed.

What I claim is:—

1. A device of the class described comprising a chassis, wheels mounted in the forward and rear ends of said chassis, handle bars extending upwardly and angularly from the chassis adjacent the rear end, and a foot rest connected to the handle bars for supporting the weight of the operator.

2. A device of the class described comprising a chassis, wheels mounted in the forward and rear ends of said chassis, handle bars extending upwardly and rearwardly from the chassis near its rear end, legs extending downwardly and rearwardly from the handle bars, said legs being pivoted to the handle bars to enable the same to be thrown upwardly and out of operative position, a foot rest connecting the extreme rear ends of the legs, and extensions on the rear axle of the rear wheel for supporting the legs and foot rest in operative position.

3. A device of the class described comprising a chassis consisting of a pair of parallel side bars, said bars being curved down intermediate their ends, wheels pivoted between the forward and rear ends of the bars, a rack adjacent the forward end of the chassis, handle bars attached to and extending upwardly from a point near the rear end of the chassis, braces for supporting the handle bars in proper position, an axle for the rear wheel of the device, extensions on said axle, a pair of legs pivoted to the handle bars intermediate their ends, and a foot rest connecting the extreme rear end of the legs to provide a supporting means for the operator of the device, the said legs engaging the extensions on the axle when in operative position to limit the downward movement of the foot rest.

In testimony whereof I affix my signature in presence of two witnesses.

WILLIAM H. MAYFIELD.

Witnesses:
J. M. CONKLIN,
F. DE STUART.

Copies of this patent may be obtained for five cents each, by addressing the "Commissioner of Patents, Washington, D. C."